Nov. 30, 1937.　　　M. SEVERANCE　　　2,100,877
MILK STOOL
Filed Jan. 9, 1936
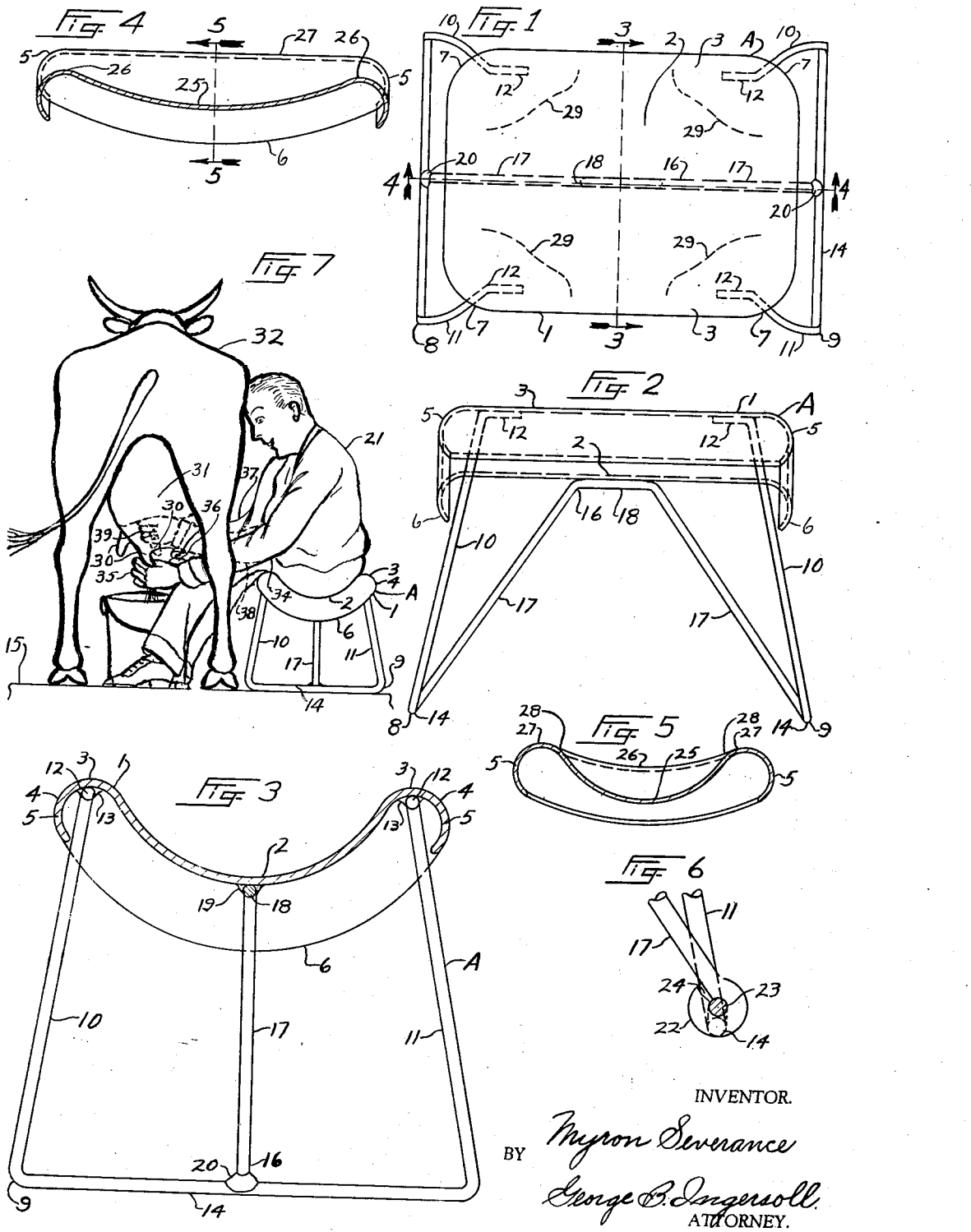
INVENTOR.
Myron Severance
BY George B. Ingersoll
ATTORNEY.

Patented Nov. 30, 1937

2,100,877

UNITED STATES PATENT OFFICE 2,100,877

MILK STOOL

Myron Severance, Rochester, Mich.

Application January 9, 1936, Serial No. 58,245

18 Claims. (Cl. 31—56)

My invention relates to improvements in stools for supporting a person while engaged in the operation of milking a cow or similar animal, and the objects of my improvements are, first, to provide a milk stool having a shape which will absorb all the reactions developed by the rapid reciprocating movement of the arms and hands of the operator, thus eliminating vibrations of the body developed in the milking operation by the rapid stopping and starting of the arms and hands at the beginnings and endings of their movements; second, to provide a milk stool having a shape which will provide a more comfortable seating position for the operator than is possible in conventional stools; third, to provide a milk stool that is of exceptionally light weight and which can be economically manufactured; fourth, to provide a milk stool having a seat portion provided with a rolled edge extending around its periphery to eliminate any interfering engagement with the body of the operator, and thus preventing any annoying or painful sensations and resulting in a milking operation conducted in comfort; fifth, to provide a milk stool having a seat portion provided with a flange portion extending around its periphery to enable said flange portion to be used as a handle for moving the stool to adjusted positions and to enable the stool to be quickly moved in emergencies; sixth, to provide a milk stool having a base or leg members which are adapted to be readily positioned on the floor or similar surface when said floor or similar surface is covered with straw, litter, or similar material used for bedding down cows and similar animals; and seventh, to provide a stool having a seat portion provided with a posture shape for conforming to the body of the operator when seated thereon.

I attain these objects by the mechanism illustrated in the accompanying drawing, in which:—

Figure 1 is a plan view of the milk stool; Fig. 2, a side elevation of the milk stool as disclosed in Fig. 1; Fig. 3, a sectional elevation of the milk stool as disclosed in Figs. 1 and 2, said sectional view being taken on the line 3—3, Fig. 1; Fig. 4, a sectional view of the seat portion of the milk stool disclosing a form with a posture shape for fitting the body of the operator, said sectional view being taken on the line 4—4, Fig. 1; Fig. 5, a sectional view of the seat portion of the milk stool disclosing a form with a posture shape for fitting the body of the operator, said sectional view being taken on the line 5—5, Fig. 4; Fig. 6, a partial sectional view of one of the base or leg portions of the milk stool together with a brace member attached thereto with an alternative construction to that disclosed in Figs. 1, 2 and 3; and Fig. 7, is a view of the operator seated on my milk stool and engaged in the operation of milking a cow.

Similar numerals refer to similar parts throughout the several views.

The milk stool assembly A is provided with a seat or seat member 1 having substantially a rectangular shape and provided with a concave or depressed or trough like portion having a surface 2 extending longitudinally of the seat 1 so that its lowermost portion is located at a point substantially below the uppermost and longitudinal side portions 3 of the seat 1.

The concave or depressed surface 2 is preferably formed as a partial cylindrical surface or central well portion extending longitudinally of the seat 1 and having its sides tangent with partial or semicylindrical surfaces 4 extending longitudinally of and along the front and rear edges of said seat 1, said partial or semicylindrical surfaces 4 being provided on the outer sides of the flange portions 5 which are formed by extending the main wall portions of the seat 1, the flange portions 5 being rolled over to form an overturned or overhanging edge portion extending substantially in parallel planes at the longitudinal or front and rear sides of the seat 1, the flange portions 5 being extended and continued in their overturned or rolled-over shape around the end portions of the seat 1, the end portions 6 of the flanges 5 being depressed to conform with the shape of the depressed or concave surface 2. It is to be understood, however, that the lowermost portion of the concave or depressed surface 2 may be formed with a partial cylindrical surface having a lesser radius than that disclosed in Figs. 3 and 7, and in which case said depressed surface 2 will be connected with said partial cylindrical surfaces 4 by straight or substantially straight surfaces angularly inclined to one another, and oppositely disposed about the lowermost portion of the concave or depressed surface 2.

The seat 1 will also be provided with substantial or liberal radial surfaces 7 at its corners to eliminate any annoying interference with the operator when seated in the concave or depressed surface 2, the flange portion 5 being extended around and in conformity with the peripheral shape of the seat 1.

The seat 1 is preferably constructed by forming same from a strip or sheet of material such as steel, aluminum, or similar metal, and is made of relatively light gauge or thickness to provide extreme light weight of the seat 1, with resultant light weight of the stool assembly A.

The legs 8 and 9 are preferably constructed of a cylindrical bar or rod, or of a tubular member of steel, aluminum, or similar material, the leg members 8 and 9 each being provided with upright portions 10 and 11 which are angularly inclined upwardly and inwardly toward one another as disclosed in Figs. 3 and 7, the upright portions 10 and 11 of each of the leg members 8 and 9 being further inclined upwardly and inwardly toward the central portion of the seat 1, as disclosed in Figs. 1 and 2, the upright members 10 and 11 each being provided with a flange or bent portion 12 extending adjacent the under surface of the seat 1 at points adjacent the radial surfaces 7, the flange portions 12 being secured to the under surface of the seat 1 by soldering, as indicated at 13, or by welding, brazing, or similar means.

It is to be noted that the leg members 8 and 9 are each provided with the base portion 14 for engaging the floor or similar surface 15, as disclosed in Fig. 7, the leg portions 8 and 9 thus supporting and positioning the seat 1 at the proper height above the floor 15 and positioning the operator in the milking operation. It is also to be noted that the upward and inward inclination of the upright members 10 and 11 of each of the leg members 8 and 9 toward one another, and the further inclination of the upright members 10 and 11 of each leg member 8 and 9 toward the central portion of the seat 1 will position the base portion 14 of each leg member so that they will be located beyond the ends of the seat 1, as viewed in Figs. 1 and 2.

The upright members 10 and 11 are inclined toward one another sufficiently to clear the inner edge of the flange portion 5 as it is assembled in its position for soldering, as at 13, Fig. 3.

The brace or reinforcement member 16 is provided with oppositely disposed portions 17 which are upwardly and inwardly inclined toward one another and are extended to form the relatively straight portion 18 at the upper extremities of the portions 17, the portion 18 being adapted to be secured to the underside of the wall portion, of the seat 1, provided with the concave or depressed surface 2 by soldering, as indicated at 19, or by welding, brazing, or similar means.

The lower ends of the portions 17 are secured to the base portions 14 by soldering, as indicated at 20, Fig. 3, or by welding, brazing, or similar means.

It is also to be noted that the extremities of the end portions 14 where they respectively join the upright members 10 and 11, will also be positioned at points located beyond the outermost surfaces of the longitudinal portions of the flanges 5 of the seat 1, thus providing an exceptionally large projected area of contact of the stool assembly A, with the floor 15, the base portions 14 being positioned substantially in parallel planes, said planes extending substantially at right angles to the longitudinal center of the concave or depressed surface 2 to provide rigid bracing for the seat 1 and to prevent the stool assembly A from being easily tilted or overturned, thus insuring that the stool assembly A may be moved during the milking operation, only by sliding along the surface of the floor 15 when the operator 21 is seated therein as disclosed in Fig. 7, this however being readily accomplished when desired or in emergencies, by the operator grasping the flange portion 6 at the end of the seat 1 and by raising his weight partially off of the seat 1.

If desired, the portions 17 of the leg members 8 and 9 may each be provided at their lower end with the loop portion 22 which may be extended around and to enclose a raised portion 23, as disclosed in Fig. 6, and located substantially at the central portion of each of the base portions 14, the end of the loop portion of each of the loop portions 22 being suitably secured to the portion 17, as by welding, indicated at 24, Fig. 6, or by soldering, brazing, or similar means, and also the lower ends of the portions 17, if desired may be connected to the central portions of the base portions by soldering as indicated at 20, Fig. 3, or by brazing, welding or similar means.

If it is desired to construct the seat 1 so that it will more efficiently fit the body of the operator seated thereon, the seat 1 may be modified in construction and provided with the posture or concave or depressed surface 25 as disclosed in Figs. 4 and 5, the depressed surface 25 in this case being provided substantially as a partial spherical surface dipped in the center and having its end portions 26 raised or positioned substantially above the lowermost portion of the depressed surface 25, said lowermost portion being located substantially at the central portion of the longitudinal center of the seat 27, the seat 27 being provided with the flange portion 5 extending therearound in a similar way to that disclosed relative to the seat 1.

Also the depressed surface 25 has its end portions 26 raised substantially from its lowermost portion so that the end portions 26 are not positioned as far below the uppermost surfaces of ends of the seat 27 as is the case with the end portions of the concave or depressed surface 2 of the seat 1, which is cylindrical in shape and extends longitudinally throughout the length of the seat 1, so that the end portions of the concave or depressed surface 2 are located substantially at the same distance below the uppermost surfaces of the side portions 3.

In a similar way the side portions 28 of the spherical shaped surface 25, at the transverse center line thereof, conforming to the line 3—3, Fig. 1, are located nearer the longitudinal sides of the flange portions 5 than the remaining side or edge portions of the spherically shaped or depressed surface 25, thus providing a depressed surface 25 which substantially fits the body of the operator when seated thereon and forms a posture seat therefor.

The elevation of the depressed or concave surface 25 is disclosed in its general shape by the dotted lines 29 in Fig. 1, the dotted lines 29 indicating the general outline of the depressed surface 25 as having been formed in the seat 1, it being understood that this posture or concave or depressed surface 25 may be added or permitted as desired to meet the needs of the purchasers.

Fig. 7 discloses the operator 21 seated on the stool assembly A and engaged in the operation of milking a cow or similar animal. In the operation of milking, the operator 21 grasps the nipples or teats 30 of the udder 31 of the cow 32, or similar animal, and by a series of rapid reciprocating movements the milk is forced or ejected into the pail or receptacle 33, the nipples or teats 30 being alternately gripped and released to force the milk out of the nipples or teats 30 of the udder 31.

It is to be noted that the left arm 34 and the left hand 35, as well as the right hand 36 and the right arm 37, when operated in a series of rapid reciprocating movements, will be operated in a series of alternate strokes so that the left arm 34 and the left hand 35 will be at the bottom of their downward stroke while the right hand 36 and the right arm 37 will be substantially at the uppermost end of its stroke or movement, this being repeated alternatively with each arm and hand during the milking operation, the position of the right arm 37 and the right hand 36 being indicated respectively by the dotted lines 38 and 39 in Fig. 7 to indicate substantially the length of movement of one of the arms and hands of the operator, the other arm and hand of the operator moving substantially through a like distance but with an alternative operation so that one arm and one hand of the operator is moved up while the other arm and other hand is moved downwardly.

This reciprocating and alternative movement of the arms and hands of the operator, substantially in up and down parallel directions, is done very rapidly and tends to turn or revolve the body of the operator about the seat 1 or 27 of the stool assembly, with the result that the body of the operator tends to vibrate and become unbalanced when seated on a conventional milk stool having substantially a flat seat surface, or where the milk stool is provided conventionally with a single leg support at its center, or where the milk stool is provided with two or more leg portions which are not positioned to engage a sufficient area of the floor or similar supporting surface to rigidly support the stool assembly to absorb the reactions in the body of the operator 21 due to the rapid reciprocating and alternate and oppositely disposed movements of the arms and hands of the operator 21.

In my invention the surface of the seat 1 or 27, upon which the operator sits, is depressed sufficiently below the longitudinal side portions of the seat so that the operator's body is rigidly positioned and assists the body of the operator to efficiently absorb the reactions from the above described movements of the milking operation.

Also the depressed surface of the seats 1 or 27 enables the fatty portions of the body of the operator 21 to be supported by the upwardly extending portions of the seat in such a way that the hip bones are relieved of bearing or supporting excessive weight such as is the case with conventional stools with which the operator is seated upon substantially level or flat surfaces, the flesh of the thighs of the operator and around the hip bones forming a substantial cushion of flesh interposed between the hip bones of the operator and the seat 1 or 27.

Also the flange portions 5 render the stool assembly readily movable by the operator grasping the lowermost portion of the flange 5 located at the ends of the seat 1 or 27 and indicated at 6 in Fig. 3, in an emergency such as where the cow 32 may side step and shove against the operator 21, thus allowing the operator to quickly grasp the flange 5 as indicated at 6 at either of the ends of the seat 1 or seat 27 and shift the stool assembly longitudinally or to and from the cow 32, with rapidity and ease to avoid injuries to the operator 21 or overturning of the milk pail 33.

Also it is to be noted that the flange portion 5 of the seat 1 or 27 will permit the stool to be thrown around as necessary or as desired, in an inverted position in which the stool will rest upon the surfaces 3 on the floor surface 15 and yet will render the flange portions 5 easily cleaned from any dirt, straw, or other debris usually encountered in stables where cows or similar animals are kept, which would not be the case if the flanges 5 were further folded around so that their ends lay substantially adjacent or against the under side of the seat 1.

It is also to be noted that the base portions 14 are located at opposite ends of the stool assembly A and permits the stool to be lowered down into straw, litter, or similar debris, without displacing or tilting the stool in any way. Also the oppositely disposed portions 17 of the brace 14 are arched so that they will fit down over such litter without tending to displace or up end the stool assembly.

It is to be noted that definite and different heights of stools for different operators can be readily obtained by increasing or decreasing the lengths of the leg members 8 and 9 throughout, together with the brace member 16.

In operation the stool assembly A is placed at the right side of the cow 32 with the concave or depressed surfaces 2 or 25 having its longitudinal center extending substantially parallel with the side of the cow, the operator 21 seating himself on the concave or depressed surface 2 or posture surface 25 with his legs extending over the forward longitudinal side of the seat 1 or 27.

Then by grasping the nipples or teats 30 with the hands 35 and 36, the operator will, by a series of rapidly reciprocating and oppositely disposed movements cause the milk to flow from the udder 31 into the pail or receptacle 33.

At the same time the reactions that are set up in the body of the operator 21 are absorbed by the upwardly extending sides of the seat 1 or 27, thus not only providing a seat which efficiently absorbs all reactions developed in the milking operation but provides a stool that enables the operator 21 to be seated in a comfortable position thereon without supporting the major weight of his body on the hip bones.

I claim:

1. In a stool for use in the operation of milking a cow, the combination of a seat member provided with a depressed central well portion extending longitudinally thereof, and adapted to receive the operator in a seated position thereon while engaged in the milking operation and facing in a direction substantially at right angles to the longitudinal center of the cow, said seat member having side portions connecting with and extending substantially above the lowermost portion of said central well portion, said side portions extending substantially parallel with one another and with the longitudinal center of the cow, said side portions each being provided with a portion of arcuate shape having a roll over edge extending therewith, said seat member being further provided with end portions connecting with said central well portion and conforming to the depressed shape thereof, said end portions each being provided with a portion of arcuate shape having a roll over edge connecting with said arcuate portion of said side portions, said arcuate portions of said side and said end portions being continued to extend entirely around the periphery of said seat member, a pair of leg members each provided with a pair of upright portions upwardly and inwardly inclined toward one another, each pair of said upright portions being inwardly inclined toward the other of said pair of leg members, said upright portions being provided with flange portions for attaching to said seat member, each of said leg members being provided with a base portion adapted to engage a floor or similar supporting surface, said base portions extending substantially parallel with the other and at right angles with the longitudinal center of the cow, means for attaching said flange portions of said upright portions to said seat member, a brace member provided with oppositely disposed portions connected with central portions of said base portions, said oppositely disposed portions being upwardly and inwardly inclined, said brace member being provided with a relatively straight portion connecting said oppositely disposed portions, and means for attaching said relatively straight portion of said brace member to said seat member.

2. In a stool for use in the operation of milking a cow, the combination of a seat member provided with a depressed central well portion extending longitudinally thereof, and adapted to receive the operator in a seated position thereon while engaged in the milking operation and facing in a direction substantially at right angles to the longitudinal center of the cow, said seat member having side portions connecting with and extending substantially above the lowermost portion of said central well portion, said side portions extending substantially parallel with one another and with the longitudinal center of the cow, said side portions each being provided with a portion of arcuate shape having a roll-over edge, said seat member being further provided with end portions connecting with said central well portion and conforming to the depressed shape thereof, said end portions each being provided with a portion of arcuate shape having a roll-over edge connecting with said arcuate portion of said side portions, said arcuate portions being connected at their ends with curved portions each provided with arcuate portions joining with said first mentioned and said second mentioned arcuate portions to provide arcuate portions extending continually and entirely around the periphery of said seat member, a pair of leg members connected with said seat member and each having base portions extending longitudinally substantially at right angles to the longitudinal center of the cow, and a brace member connecting said base portions of said leg members with said seat member.

3. In a stool for use in the operation of milking a cow, the combination of a seat member provided with a depressed central well portion extending longitudinally of said seat member and adapted to receive the operator in a seated position thereon while engaged in the milking operation and facing in a direction substantially at right angles with the longitudinal center of the cow and said depressed central well portion, said seat member being provided with a portion of arcuate shape having a roll over edge extending entirely and continuously around the periphery of said seat member, a pair of leg members each provided with a pair of upright portions upwardly and inwardly inclined toward one another, each pair of said upright portions being inclined inwardly toward the other of said pair of leg members, said upright portions being provided with flange portions for attaching to said seat member, each of said leg members being provided with a base portion adapted to engage a floor or similar supporting surface, each of said base portions extending substantially parallel with the other and at right angles with the longitudinal center of the cow, means for attaching said flange portions of said upright portions to said seat member, a brace member provided with oppositely disposed portions connected with central portions of said base portions, said oppositely disposed portions being upwardly and inwardly inclined, said brace member being provided with a relatively straight portion connecting said oppositely disposed portions, and means for attaching said relatively straight portion of said brace member to said seat member.

4. A stool for supporting an operator in a seated position thereon while milking a cow and comprising a seat member having a depressed seating surface extending longitudinally thereof and substantially parallel with the longitudinal center of the cow, said seat member having arcuate edge portions, and a pair of oppositely disposed leg members having base portions extending longitudinally in directions extending at right angles to the longitudinal center of the cow, said leg members being connected with said seat member within said arcuate edge portions.

5. In a milk stool, the combination of a seat member having a well portion extended to form a hollow roll-over edge portion extending around the periphery of said seat member, said hollow roll-over edge portion being open at its inner side to facilitate use as a handle member for the milk stool, and leg members connected with inside surfaces of said hollow roll-over edge portion of said seat member.

6. In a milk stool, the combination of a seat member having substantially a rectangular shape and provided with a well portion extended to form a roll-over edge portion extending around the periphery of said seat member, said roll-over edge portion being open at its inner side to facilitate use as a handle member for the milk stool, said seat member being further provided with a concave surface extending longitudinally thereof, and leg members connected with said roll-over edge portion of said seat member.

7. In a milk stool, the combination of a seat member having a trough extending thereacross and provided with an arcuate portion having a downwardly and inwardly extending edge portion at each of the ends and sides of said trough to provide handle portions for the milk stool, and leg members connected with said arcuate portions of said seat member, said leg members being positioned adjacent the edge surfaces of said downwardly and inwardly extending edge portions of said arcuate portions of said seat member.

8. In a milk stool, the combination of a seat member having a trough extending thereacross and provided with a downwardly extending edge portion at each of the ends of said trough to provide handle portions for the milk stool, said edge portions each having substantially a semicylindrical shape having its opening at its inner side, and leg members extending into said opening and connected with said semicylindrical shaped edge portion of said seat member.

9. In a milk stool, the combination of a seat member having substantially a rectangular shape and provided with substantial radii at its corners, said seat member being provided with hollow roll-over edge portions extending adjacent its sides, ends, and corner radii, said seat member being further provided with a trough extending longitudinally thereof, and leg members connected with said seat member adjacent said roll-over edge portion.

10. In a milk stool for supporting an operator while engaged in a milking operation in which the hands and arms of the operator are rapidly reciprocated in opposite up and down directions, the combination of a seat member provided with a trough portion engaged by the operator when seated thereon and extending longitudinally in a direction substantially at right angles to said opposite up and down directions in which the hands and arms of the operator are reciprocated, said seat member being provided with arcuate-shaped portions at its sides to provide handle members, said trough portion of said seat member absorbing the reactions developed in the body of the operator by the reciprocating movement of the hands and arms, and a structure connected with and supporting said seat member, said structure being connected to said seat member within said arcuate-shaped portions.

11. In a milk stool for supporting an operator while gripping portions of the udder of a cow or similar animal in a milking operation in which the hands and arms of the operator are rapidly reciprocated in opposite up and down directions, the combination of a member provided with a surface depressed substantially below its side portions and adapted to support the operator in a seated position, said depressed surface having oppositely disposed inclined sides extending longitudinally substantially at right angles to said opposite up and down directions to absorb reactions developed in the body of the operator by the rapid reciprocation of said hands and arms of the operator, said member having overhanging edge portions forming a channel extending entirely therearound, and a structure for engaging a floor or similar supporting surface and connected with said member, said structure having its points of connection located within said channel of said member and being substantially covered by overhanging portions of said member, said structure supporting said member.

12. In a milk stool for supporting an operator while gripping portions of the udder of a cow or similar animal in a milking operation in which the hands and arms of the operator are rapidly reciprocated in opposite up and down directions, the combination of a member provided with a surface depressed substantially below its side portions and adapted to support the operator in a seated position, said depressed surface having oppositely disposed inclined sides extending longitudinally substantially at right angles to said opposite up and down directions to absorb reactions developed in the body of the operator by the rapid reciprocation of said hands and arms of the operator, said member being provided with downwardly extending edge portions forming hollow handle members for the milk stool, and a structure for engaging a floor or similar supporting surface and connected with said member, said structure entering said hollow members to connect with and support said member.

13. In a stool for supporting an operator while milking a cow or similar animal, the combination of a seat member having a trough extending longitudinally thereof and substantially parallel with the longitudinal center of the cow or similar animal during the milking operation, said trough engaging the hips of the operator, and a pair of leg members connected with and supporting said seat member, said leg members having base portions extending substantially in parallel planes and at right angles to said trough, said base portions being located in vertical planes extending beyond the edge portions of the ends of said seat member.

14. In a stool for supporting an operator while milking a cow or similar animal, the combination of a seat member having a trough extending longitudinally thereof and substantially parallel with the longitudinal center of the cow or similar animal during the milking operation, said trough engaging the hips of the operator, and a pair of leg members connected with and supporting said seat member, said leg members having base portions extending substantially in parallel planes and at right angles to said trough, the extremities of said base portions being located in vertical planes oppositely disposed about said seat member and extending beyond the edge portions of the sides of said trough.

15. In a stool for supporting an operator while milking a cow or similar animal, the combination of a seat member provided with a trough extending substantially parallel with the longitudinal center of the cow or similar animal during the milking operation, said trough engaging the hips of the operator, said seat member being provided with roll-over edge portions extending longitudinally at the upper longitudinal sides of said trough to permit the thighs of the operator to engage the upper and outermost longitudinal sides of said trough without annoyance, and a structure connected with and supporting said seat member, said structure extending into said roll-over edge portion between the lower surface of said trough and the edge surface of said roll-over edge portions.

16. In a milk stool, the combination of a seat member provided with a spherically shaped depressed portion to provide a posture seating surface for engaging the hips of a person performing the milking operation, said member having an arcuate portion extending entirely therearound, and a structure connected with and supporting said seat member, said structure entering said arcuate portion.

17. In a milk stool, the combination of a rectangular seat member provided with a spherically shaped depressed portion to provide a posture seating surface for engaging the hips of a person performing the milking operation, said spherically shaped depressed portion having its greatest length extending longitudinally of said seat member, said member having an arcuate portion extending entirely therearound, and a structure connected with and supporting said seat structure, said structure entering said arcuate portion.

18. In a milk stool, the combination of a seat member provided with a spherically shaped depressed portion to provide a posture seating surface for engaging the hips of a person performing the milking operation, said seat member being provided with a hollow roll-over edge portion extending around its periphery and having an open inner side to permit said roll-over edge portion to be utilized as a handle portion for moving or lifting the milk stool, and a structure connected with and supporting said seat member, said structure extending within said hollow roll-over edge portion.

MYRON SEVERANCE.